(12) United States Patent
Sears et al.

(10) Patent No.: US 11,543,074 B1
(45) Date of Patent: Jan. 3, 2023

(54) TRACK-MOUNTED WORKSTATION ASSEMBLY

(71) Applicants: Michael John Sears, Dallas, TX (US); Simon Nicholas Johnson, Rowlett, TX (US)

(72) Inventors: Michael John Sears, Dallas, TX (US); Simon Nicholas Johnson, Rowlett, TX (US)

( * ) Notice: Subject to any disclaimer, the term of this patent is extended or adjusted under 35 U.S.C. 154(b) by 0 days.

(21) Appl. No.: 16/900,633

(22) Filed: Jun. 12, 2020

Related U.S. Application Data

(60) Provisional application No. 62/860,458, filed on Jun. 12, 2019.

(51) Int. Cl.
*F16M 11/42* (2006.01)
*F16M 13/02* (2006.01)

(52) U.S. Cl.
CPC ........ *F16M 11/425* (2013.01); *F16M 13/022* (2013.01); *Y10S 248/919* (2013.01)

(58) Field of Classification Search
CPC .. F16M 11/425; F16M 13/022; Y10S 248/919
USPC ........................ 211/151; 248/288.11, 288.31
See application file for complete search history.

(56) References Cited

U.S. PATENT DOCUMENTS

| | | | | |
|---|---|---|---|---|
| 6,286,794 B1* | 9/2001 | Harbin | ............... | F16M 11/2064 |
| | | | | 248/281.11 |
| 7,661,966 B2* | 2/2010 | Ohanesian | ........... | H01R 25/142 |
| | | | | 439/120 |
| 8,596,599 B1* | 12/2013 | Carson | ............... | F16M 11/2085 |
| | | | | 248/920 |
| 9,228,693 B2* | 1/2016 | Ditges | .................... | F16M 11/24 |
| 9,549,609 B2* | 1/2017 | Constantino | ........... | A47B 21/04 |
| 9,753,358 B1* | 9/2017 | Hsin | .................... | G03B 17/561 |
| 9,857,037 B1* | 1/2018 | Wu | ........................ | F21V 23/001 |
| 10,066,785 B1* | 9/2018 | Chen | ..................... | F16M 11/14 |
| 2010/0213151 A1* | 8/2010 | Theesfeld | ............. | F16M 11/24 |
| | | | | 211/151 |
| 2011/0068243 A1* | 3/2011 | Zou | ..................... | F16M 11/046 |
| | | | | 248/231.91 |
| 2011/0110616 A1* | 5/2011 | Watson | ................. | F16C 29/005 |
| | | | | 403/374.1 |

(Continued)

FOREIGN PATENT DOCUMENTS

WO WO-2008091998 A2 * 7/2008 ............. F16M 11/04

OTHER PUBLICATIONS

Ergomart connect installation instructions 2016 (Year: 2016).*

*Primary Examiner* — Terrell L McKinnon
*Assistant Examiner* — Ding Y Tan
(74) *Attorney, Agent, or Firm* — Law Office of Sam Sokhansanj PLLC

(57) ABSTRACT

A track mounted workstation assembly is disclosed having a housing including a track and one or more communication or electrical or communication ports, and one or more roller mount assemblies further including a sliding carriage configured to slide along the track. In addition, the mounts may further include wiring and cables configured to communicate with the communication or electrical ports of the track housing at either ends. In addition, the mounts may further include one or more receiving members for receiving one or more articulating arms for monitors, peripherals, and other equipment.

11 Claims, 6 Drawing Sheets

(56) References Cited

U.S. PATENT DOCUMENTS

| | | | |
|---|---|---|---|
| 2014/0246468 A1* | 9/2014 | Montgomery | B60K 37/02 224/548 |
| 2014/0263866 A1* | 9/2014 | Hemmer | F21V 21/03 248/58 |
| 2015/0159804 A1* | 6/2015 | Bowman | F16M 11/28 248/122.1 |
| 2020/0015588 A1* | 1/2020 | Patrick | F16M 11/32 |
| 2020/0051711 A1* | 2/2020 | Ware | H01B 9/006 |

* cited by examiner

TRACK-MOUNTED WORKSTATION ASSEMBLY

CROSS-REFERENCE TO RELATED APPLICATION

This application claims the benefit of U.S. Provisional Application Ser. No. 62/860,458 filed on Jun. 12, 2019, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

Workstation mounting assemblies adapted to support computer monitors, all-in-one computers and computer keyboards encompass a wide variety of designs that are adapted to be used in various work settings. Many of these designs are specifically adapted to be used within a particular work environment. For example, such environment can be for the medical industry, warehouses, restaurant and/or fast-food ordering establishments. Further, previous track mounted workstation assemblies are typically vertically oriented, large in design, and cumbersome to use and don't provide a complete system lateral movement of operation nor accommodate heavy weights of various arms, monitors, and auxiliary equipment. Moreover, these units do not provide adequate or quick maneuverability and adjustability to the users to allow easy and quick access to computer peripherals, such as the keyboard, mouse, monitor, or other auxiliary components.

Hence, what is needed is a horizontally track-mounted workstation assembly that provides easy and quick access to computer peripherals and auxiliary equipment, provides smooth operation and lateral movement, and can withstand heavy loads, among others.

BRIEF SUMMARY

In one aspect of the disclosure described herein, a track mounted workstation assembly is disclosed that provides easy and quick access to computer peripherals and auxiliary equipment, supports multiple articulating arms, provides smooth operation and movement, and can withstand heavy loads, among other advantages. In one non-limiting exemplary embodiment, the track mounted workstation assembly may include a housing having a track and one or more communication or electrical ports, and a roller mount assembly further including a sliding carriage configured to slide along the track. In addition, the mount may further include wiring and cables configured to communicate with the communication or electrical ports of the track housing. In addition, the mount may further include one or more receiving members for receiving one or more articulating arms for monitors, peripherals, and other equipment. Here, one advantage of the horizontal track design of the disclosure described herein is that it allows payloads to be placed well above, below or away from the point of human interaction due to the multi-bearing trolley component that can handle moment loading far beyond typical laterally oriented track systems. This unique attribute places major assembly components away from valuable real estate or areas that would otherwise fall within the typical ergonomic work envelope inhabited by sitting or standing workers.

In another aspect of the disclosure described herein, a workstation mount assembly is disclosed having a housing comprised of a first track and one or more electrical outlets or communication ports disposed on either end of the housing. The workstation can further include a first mount comprising a first sliding carriage, wherein the first sliding carriage is configured to slide within the first track. In addition, the first mount can also include one or more wires configured to communicate with the electrical outlets or communication ports of the housing. The workstation mount assembly can also include a mounting plate, wherein the first track is secured to the mounting plate. Further, the first track can also include one or more channels. In addition, the first sliding carriage can include vertical and horizontally configured wheels. Further, the wheels can be received within the one or more channels of the first track. In addition, the first mount can further include a partial U-shaped configuration having a first face and a second face. Here, the sliding carriage can be secured to the first face. In addition, one or more mounting posts or bases can be secured to the second face. The housing can also include a second track disposed above or below the first track. In addition, the workstation mount assembly can also include a second mount having a second sliding carriage configured to slide within the first track. In another aspect of the disclosure described herein, a workstation mount assembly is disclosed that can include a housing comprised of a track and one or more electrical outlets or communication ports disposed on a first or second end of the housing. The workstation mount assembly can also include a plurality of mounts further comprised of one or more rolling carriages, wherein the rolling carriages are configured to move within the track and adjacent to one another. In addition, the mounts can also include one or more wires configured to communicate with the electrical outlets or communication ports of the housing at either the first or second end of the housing.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Figure 1:
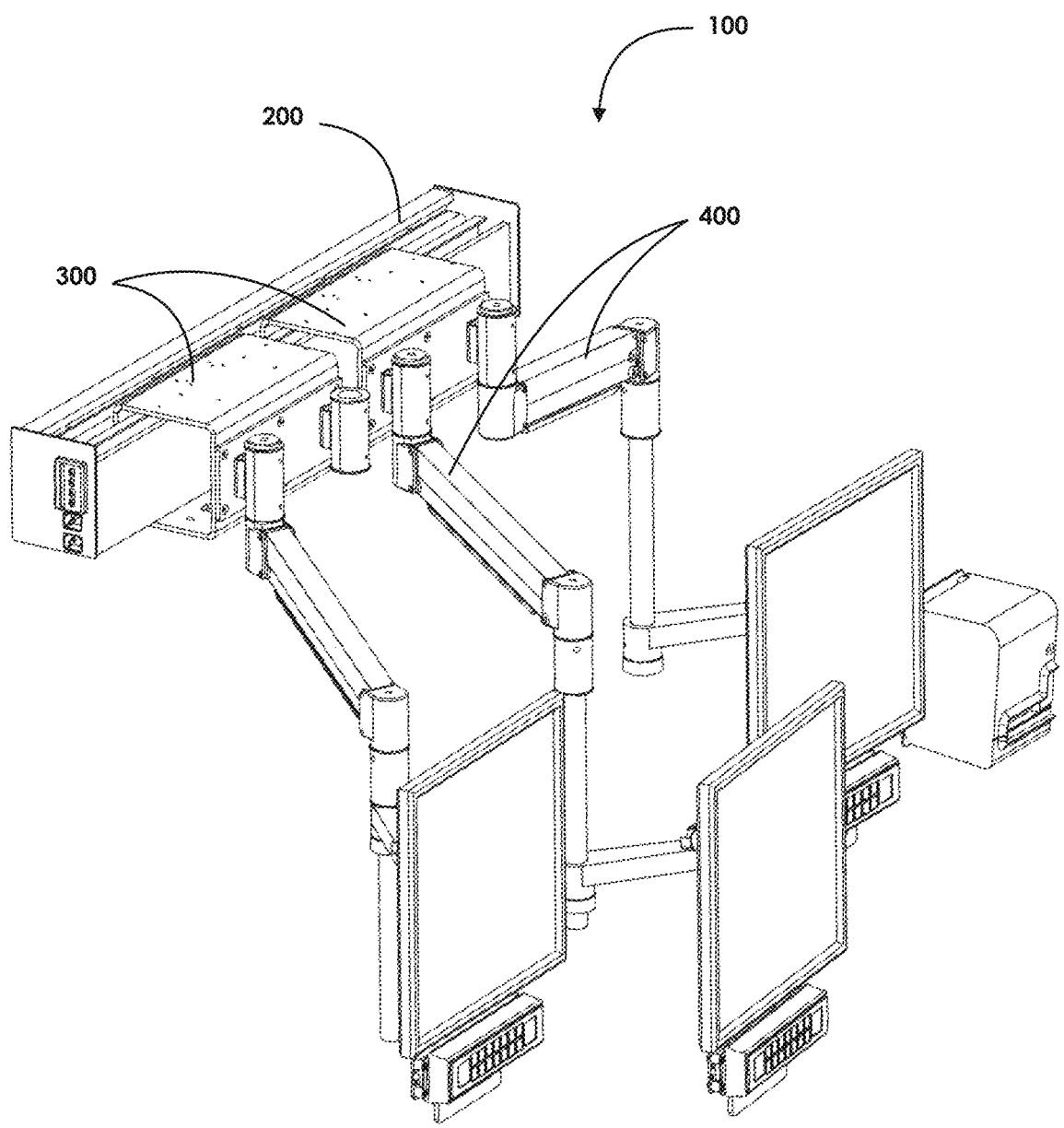
FIG. 1 illustrates a perspective view for one non-limiting exemplary embodiment of a track-mounted workstation assembly of the disclosure described herein, shown with monitor arm mounts and peripherals.

FIG. 1 illustrates one non-limiting embodiment of the track-mounted workstation support assembly 100, shown with articulating arms, monitors, and additional peripherals. In particular, assembly 100 may include a track housing 200 configured to be mounted and secured to any rigid structure, such as any wall, floor, ceiling, or the like. Assembly 100 can further include one or more roller mount assemblies 300 configured to secure to and roll, glide, or slide along one or more tracks of track housing 200. In addition, assembly 100 may include a plurality of articulating arms 400 secured to roller mount assembly 300, which can further support a variety of peripherals, such as monitors. However, it is contemplated within the scope of the disclosure described herein that the track-mounted workstation support assembly 100 of the disclosure may support any number or types of mounts, support arms, and peripherals, including but not limited to trays, point-of-service terminals, non-electronic hardware and equipment, and the like.

Figure 2A:
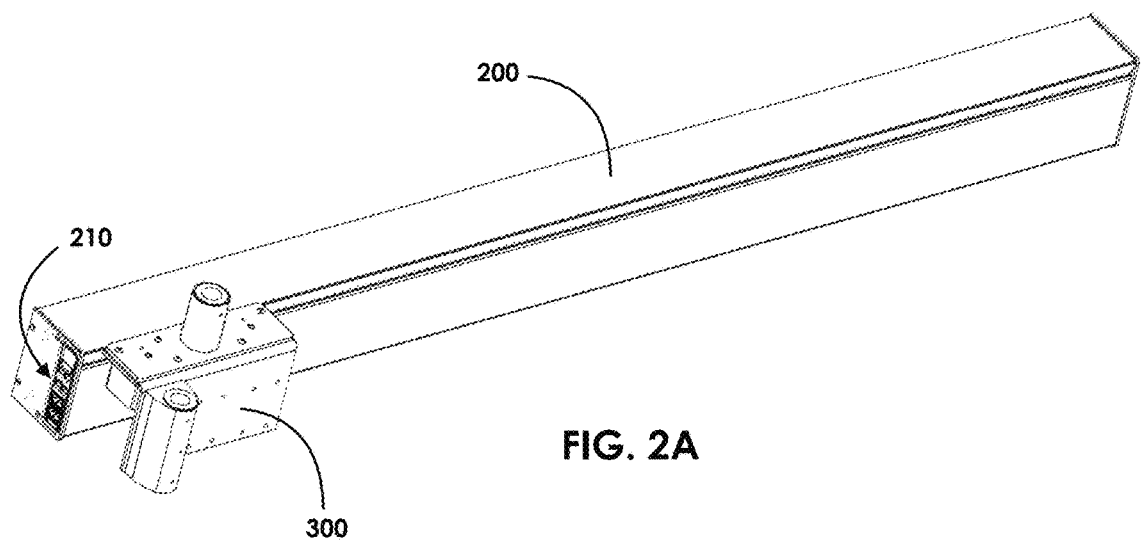
FIG. 2A illustrates a perspective partial cut-away view for one non-limiting exemplary embodiment the track housing and roller assembly of the disclosure described herein.
Figure 2B:
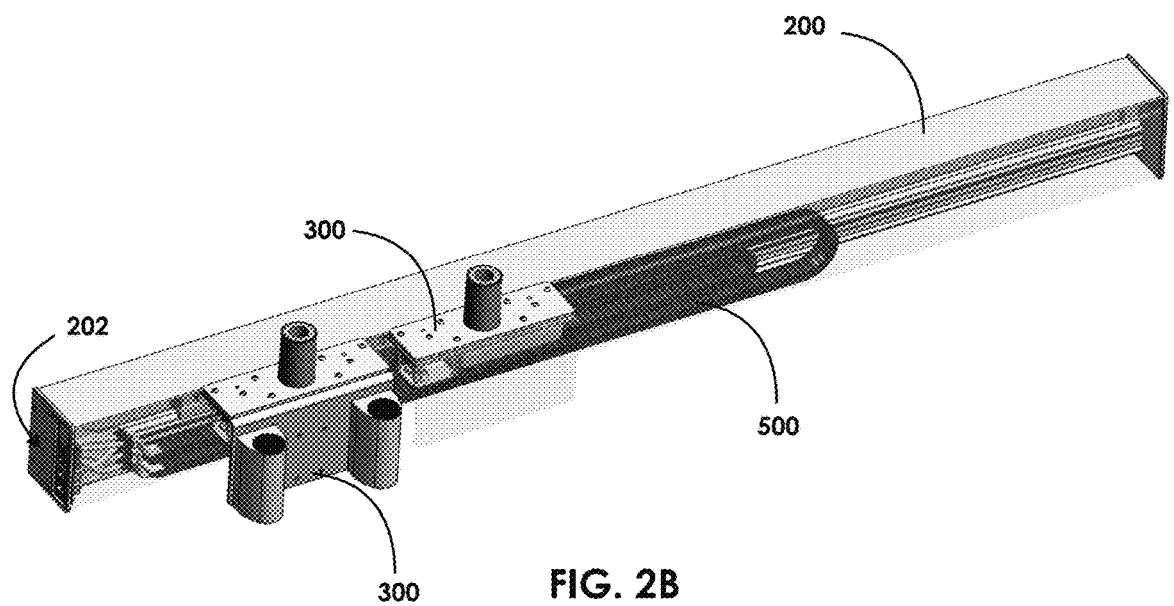
FIG. 2B illustrates another perspective view of the track housing and roller assembly of the disclosure described herein.
Figures 3A, 3B:
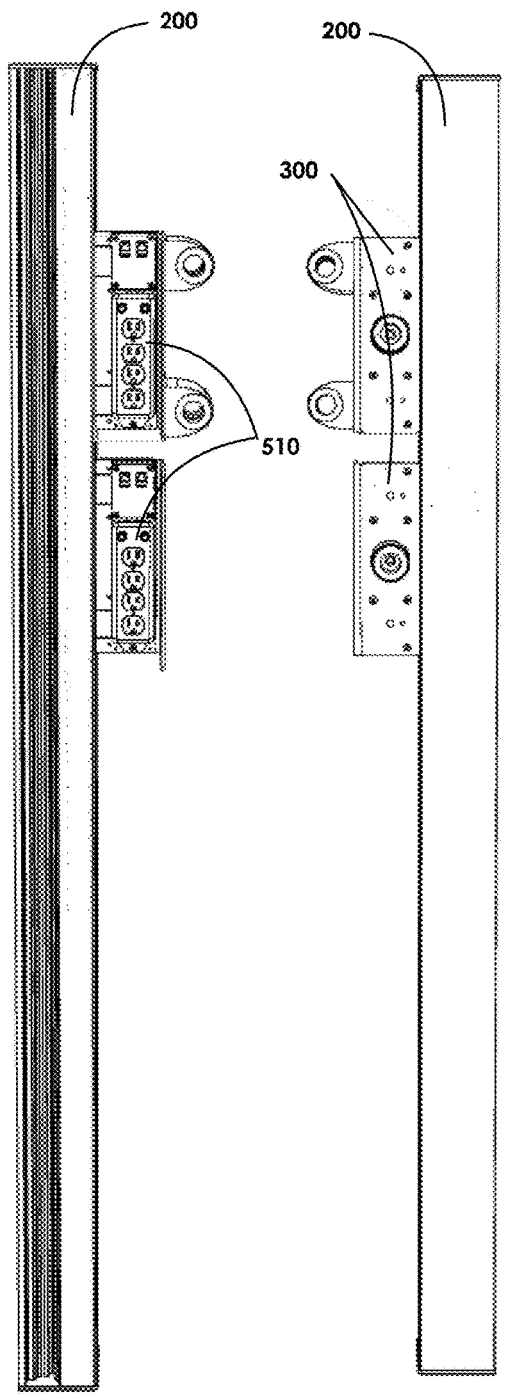
FIG. 3A illustrates a bottom view of the track housing and roller assembly of the disclosure described herein.
FIG. 3B illustrates a top view of the track housing and roller assembly of the disclosure described herein.
Figure 3C:
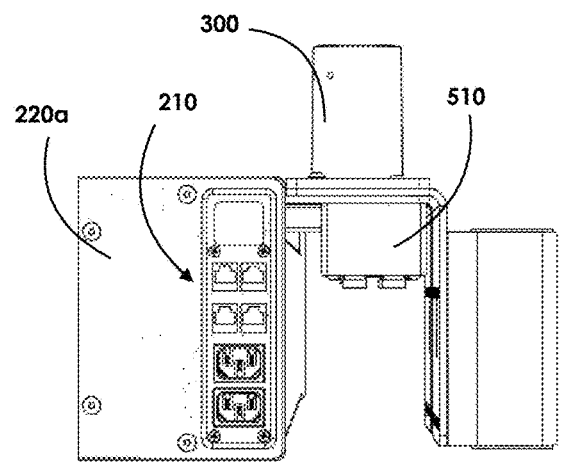
FIG. 3C illustrates a left side view of the track housing and roller assembly of the disclosure described herein.
Figure 3D:
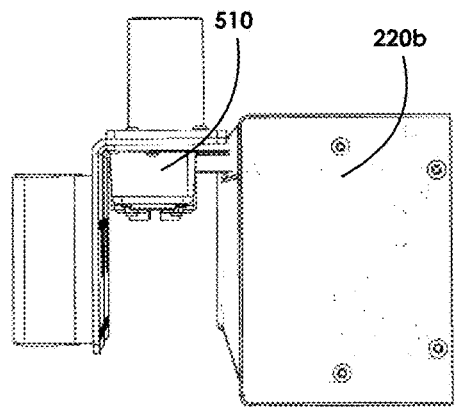
FIG. 3D illustrates a right side view of the track housing and roller assembly of the disclosure described herein.
Figure 4A:
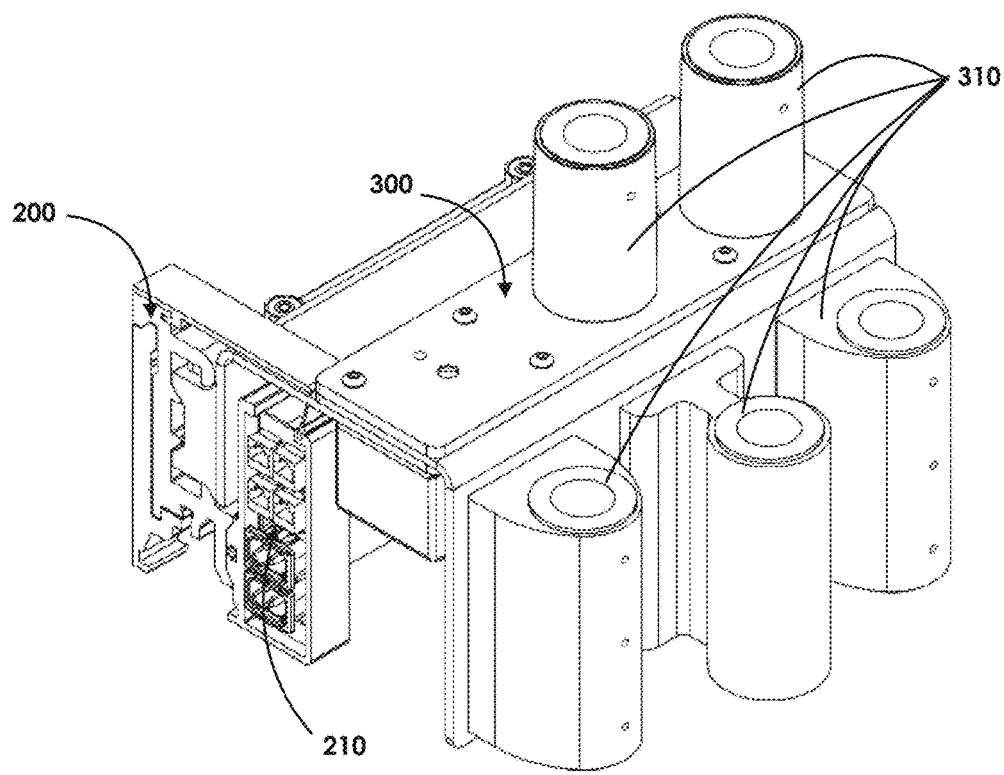
FIG. 4A illustrates a perspective view of the roller assembly of the disclosure described herein.
Figure 4B:
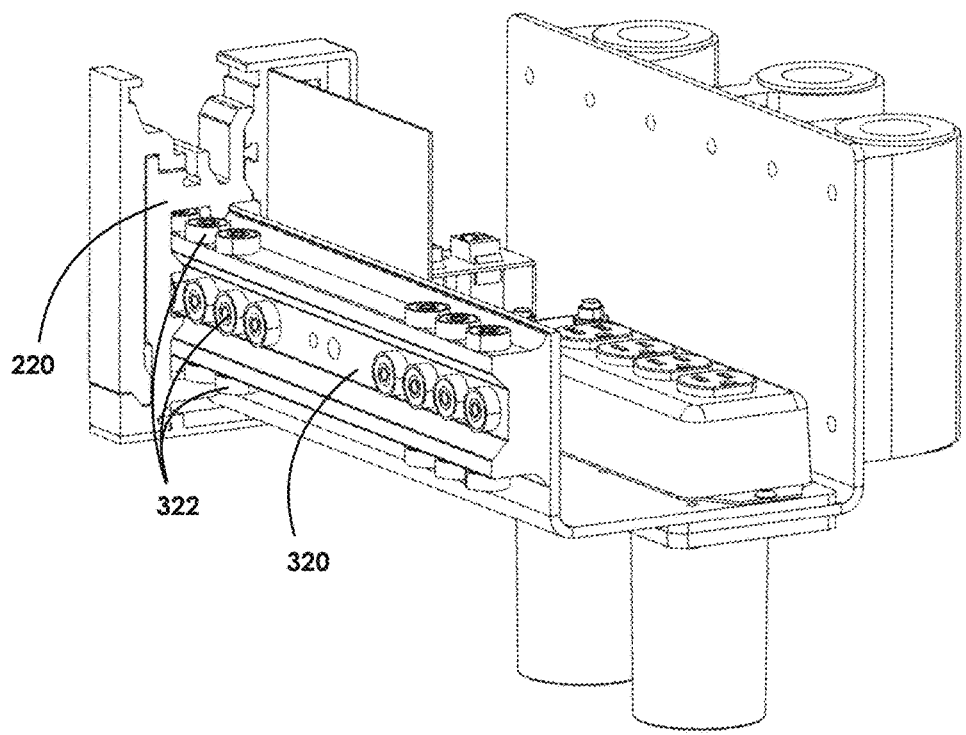
FIG. 4B illustrates another perspective view of the roller assembly of the disclosure described herein.
Figure 5A:
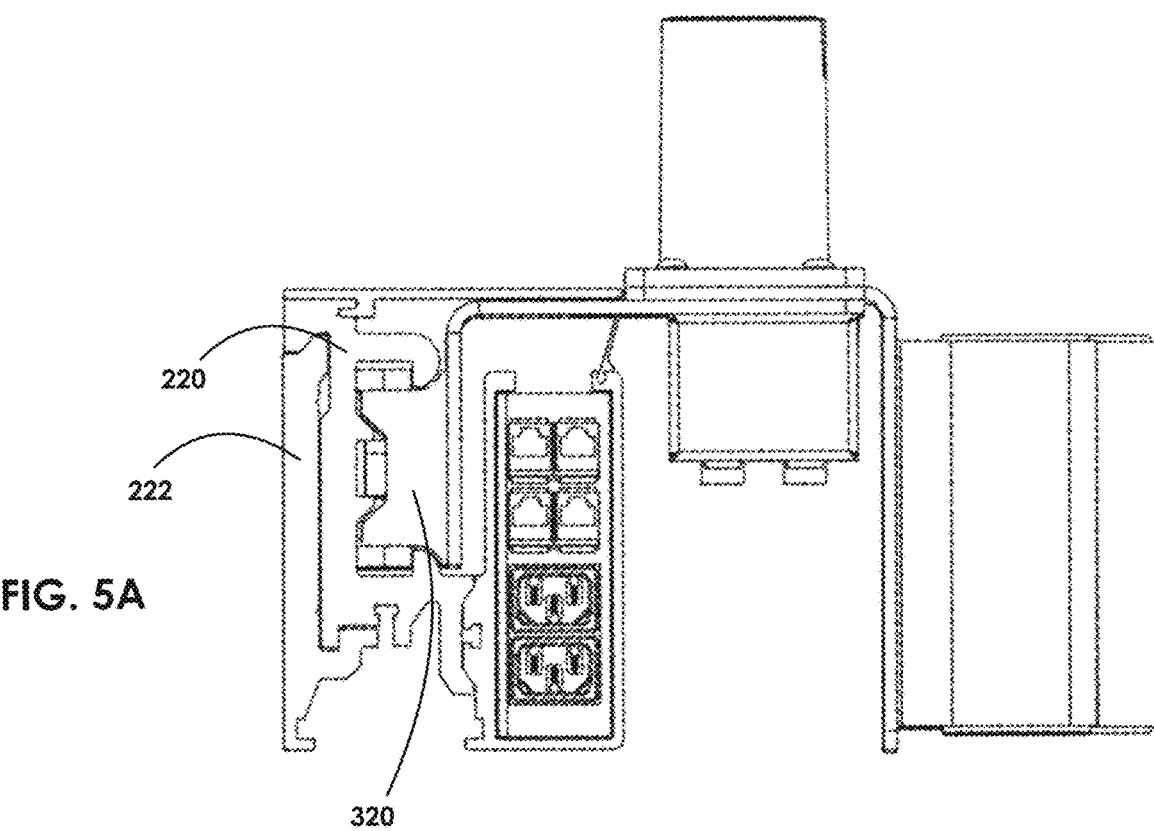
FIG. 5A illustrates a partial cross-section left side view of the roller assembly of the disclosure described herein.
Figure 5B:
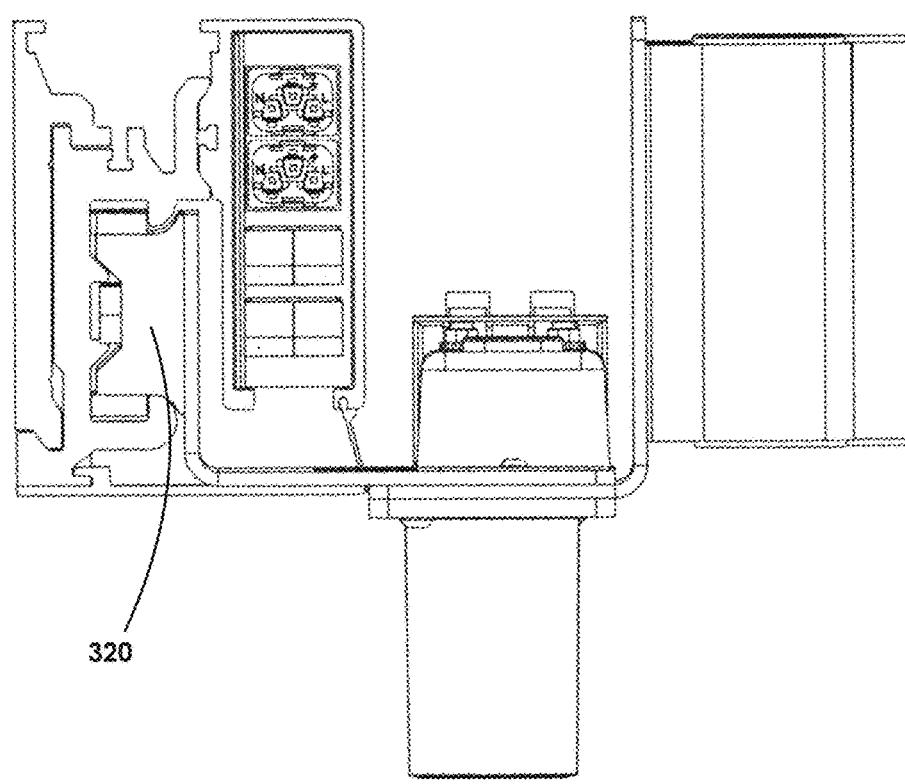
FIG. 5B illustrates a partial cross-section right side view of the roller assembly of the disclosure described herein.

FIGS. 2A-2B illustrates perspective views of the track housing 200 and roller assembly 300 of the disclosure described herein. In particular, track housing 200 may further include one or more electrical and communication ports, outlets, and connections 202 for communicating with one or more peripherals supported by assembly 100 of the disclosure described herein. These ports 202 may include but is not limited to: power outlets (e.g., 110V/120V/220V/240V); proprietary electronic equipment power connectors; local area network (LAN) and router connectors such as RJ-45; telephone connectors such as RJ-11; data connectors such as USB ports; audio-video connectors such as HDMI, DisplayPort, coax cables, VGA, TOSLINK optical audio, RCA, speaker wire, other wiring, and the like. In addition. The foregoing cables and/or wiring may be covered and disposed within a sleeve chain 500 disposed within housing 200. Here, each roller assembly 300 may include its own cable sleeve 500. In addition, sleeve chain 500 is configured to articulate and move with each roller assembly 300 to further prevent any type of kinking or breakage to one or more cables and wires disposed within each sleeve. Further ports 202 may be disposed on either end or both ends of housing 200. In addition, assemblies 300 may nest within each other. Further, multiple track housings can be stacked or configured on top of each other, each having their own independent roller assemblies 300. Alternatively, each housing 200 may include two or more tracks or rails 220 disposed above or below each other.

FIGS. 3A-3D illustrate additional views of the track housing 200 and roller assembly 300 of the disclosure described herein. In particular, roller assembly 300 may include one or more electrical units, communication ports, network connectors, power outlets, or surge protectors 510 secured underneath, on, to the sides, or around each of the roller mount assemblies, which are further connected to ports 210. In addition, track housing 200 may also include removable cover plates 220a and 220b on each of its ends. However, electrical units 510 may also be positioned in any configuration, such as vertically or on any end of roller assemblies 300. In addition, assemblies 300 can further be nested within each other. For example, one mount 300 may sized larger than another smaller sized mount, and the smaller mount may nest or slide through the first larger mount. In addition, mount assemblies 300 can include a partially inverted U-shape or J-shape configuration with various wiring or electrical units disposed underneath and hidden from view.

FIGS. 4A-4B and 5A-5B further illustrate additional views of roller assembly 300 of the disclosure described herein, illustrating partial cross-sectional view of the track and roller mount assembly for illustrative purposes. In particular, roller assembly may include one or more mounts or female receiving members for securing thereto one or more peripherals, articulating or static arms, and the like. In addition, each roller assembly 300 further includes a removable carriage or carrier 320 having a plurality wheels 322 secured to its sides and bottom region, wherein wheels 322 are configured to roll, glide, and slide along one or more grooves or channels within track or rails 220 of track housing 200. Here, rails 220 are showing having at least three channels for supporting the wheels 322 of carriage or carrier 320. In addition, track or rails 220 are further configured to be secured to a wall plate or mount 222. As shown here, each wall plate 222 may include one or more grooves, channels, cut-outs, and protrusions that correspond to or dovetail with one or more grooves, channels, cut-outs, and protrusions of track 220. In addition, assembly 300 includes a plurality of receiving or support members/mounts/posts/bases 310 having openings therein for receiving and securing thereto one or more articulating arms 400 or peripheral support devices.

Figure 6:
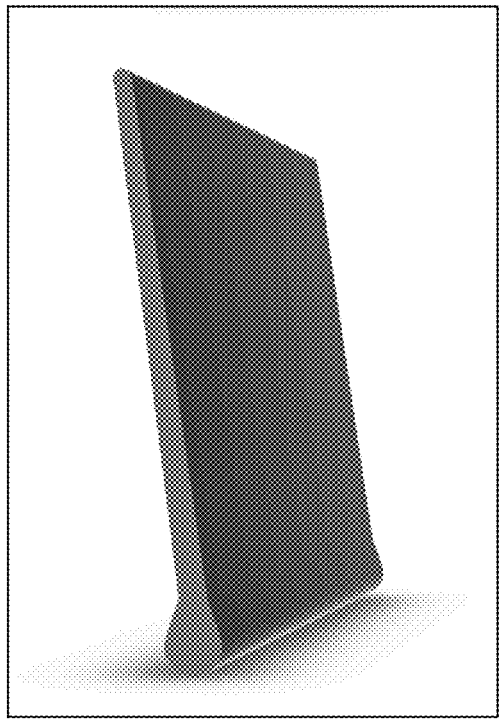
FIG. 6 illustrates a perspective view for one non-limiting exemplary embodiment the flexible seal and partial cover of the track housing.

FIG. 6 illustrate a flexible silicone cover for the track housing which can prevent dust, dirt, and other particles from entering the track housing.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. A workstation mount assembly, comprising:
    a housing comprising a first track and one or more first female electrical ports disposed on either end of the housing, wherein the first track is comprised of a first channel, second channel, and third channel;
    a first sliding carriage, wherein the first sliding carriage is configured to slide within the first track;
    the first sliding carriage comprising one or more second electrical ports, wherein the first sliding carriage further comprises a first row of wheels, a second row of wheels, and a third row of wheels, wherein the first row of wheels are disposed between the second and third row of wheels, and wherein the first row of wheels are disposed within the first channel, the second row of wheels disposed within the second channel, and third row of wheels disposed within the third channel;
    wherein the first female electrical ports are in electrical communication with the second electrical ports.

2. The workstation mount assembly of claim 1, further comprising a mounting plate.

3. The workstation mount assembly of claim 2, wherein the first track is secured to the mounting plate.

4. The workstation mount assembly of claim 1, wherein the first row of wheels are configured in a vertical orientation, and the second and third row of wheels are configured in a horizontal configuration.

5. The workstation mount assembly of claim 1, wherein the mounting plate is further comprised of a partial U-shaped configuration having a first face and a second face.

6. The workstation mount assembly of claim 5, wherein the first sliding carriage is secured to the first face.

7. The workstation mount assembly of claim 6, wherein one or more mounting posts or bases are secured to the second face.

8. The workstation mount assembly of claim 1, wherein the housing comprises a second track disposed above or below the first track.

9. The workstation mount assembly of claim 1, further comprising a second sliding carriage configured to slide within the first track.

10. A workstation mount assembly, comprising:
    a track and one or more first communication ports disposed on, near, or about a first or second end of the track;
    a first sliding mount having a first side, second side, and third side, wherein each of the first side, second side, and third side comprise an interior surface and an exterior surface;
    a rolling carriage secured to the exterior surface of the first side of the first sliding mount, wherein the rolling carriage is configured to move within the track;
    one or more second female communication ports secured to the interior surface of the second side of the first sliding mount, wherein the one or more second female communication ports are in communication with the one or more first communication ports; and
    a second mount secured to the exterior surface of the third side of the first sliding mount, wherein the second mount is configured to support an articulating arm.

11. A workstation mount assembly, comprising:
    a housing comprising a track;
    one or more first power outlets disposed at a distal end of the track;
    a sliding mount, wherein the sliding mount is configured to move along the track; and
    the sliding mount comprising one or more second female power outlets, wherein the one or more second female power outlets are connected to the one or more first power outlets or first female communication ports via a plurality of cables, wherein the plurality of cables are disposed within an articulating sleeve, and wherein the articulating sleeve is disposed within the housing and configured to articulate in conjunction with the sliding mount.

* * * * *